(12) United States Patent
Chang

(10) Patent No.: US 6,639,792 B1
(45) Date of Patent: Oct. 28, 2003

(54) INNER RACK OF A MOBILE RACK IN A COMPUTER

(76) Inventor: Cheng-Chun Chang, 11F-2, No. 11, Lane 202, Jing-Shing Road, Wen-Shan DT, Taipei (TW)

( * ) Notice: Subject to any disclaimer, the term of this patent is extended or adjusted under 35 U.S.C. 154(b) by 0 days.

(21) Appl. No.: 10/147,876

(22) Filed: May 20, 2002

(30) Foreign Application Priority Data

Apr. 11, 2002 (TW) ..................................... 91204727 U

(51) Int. Cl.$^7$ ................................................ G06F 1/16
(52) U.S. Cl. .................... 361/685; 361/726; 439/928.1; 174/52.1
(58) Field of Search ................................. 361/679–687, 361/724–727; 312/223.2, 332.1, 348.1–348.6; 439/928.1; 174/52.1; 360/73.02; 379/88.26

(56) References Cited

U.S. PATENT DOCUMENTS

| | | | | |
|---|---|---|---|---|
| 5,694,290 A | * | 12/1997 | Chang | 361/685 |
| 5,959,834 A | * | 9/1999 | Chang | 361/685 |
| 6,272,011 B1 | * | 8/2001 | Chen | 248/611 |
| 6,442,029 B1 | * | 8/2002 | Chang | 361/724 |
| 6,563,714 B2 | * | 5/2003 | Chang | 361/752 |

* cited by examiner

Primary Examiner—Darren Schuberg
Assistant Examiner—Hung Van Duong
(74) Attorney, Agent, or Firm—Troxell Law Office PLLC

(57) ABSTRACT

An inner rack in a mobile rack of a computer has a rack chamber disposed at a central area thereof, a signal conversion circuit board disposed at a rear side thereof with a jut out inner signal connector at an outer side thereof. The inner signal connector provides a control IC for converting a USB interface signal into an IDE interface signal and a power outlet separating from an IDE interface connector at an inner side thereof. Once an IDE interface storage device is placed in and located at the rack chamber and the inner rack is inserted into an outer rack of the mobile rack, the inner signal connector engages with an outer signal connector suitable for IDE and USB interface signals to connect an USB signal of the inner signal connector to an USB signal of the outer signal connector. The IDE interface storage device can provide functions of hot swap and plug and play via a switch control of power on/off.

5 Claims, 4 Drawing Sheets

INNER RACK OF A MOBILE RACK IN A COMPUTER

BACKGROUND OF THE INVENTION

1. Field of the Invention

The present invention relates to a an inner rack of a mobile rack in a computer, and particularly to an inner rack, which has a signal conversion circuit board to convert the USB interface signal received by the inner signal connector at the outer side thereof into the IDE interface signal via the control IC thereon with an IDE interface connector connecting with an IDE interface storage device therein for the storage device providing functions of hot-swap and plug and play.

2. Description of Related Art

Due to products related to the computer periphery being brought forth the new through the old, the space arranged in the computer main unit is not so sufficient for mounting the periphery. Besides, the hard disk drive (HHD) in an old computer is usually mounted in the case of the main unit for data read and write. Considering data reservation and backup, especially portability and security of confidential data, a so-called mobile rack such as a mobile rack for hard disk driver was developed to meet the demand of the user with great facility. In fact, the storage device in the inner rack can be ZIP disk driver, Magneto-Optical disk driver (MO), LS-120 magnetic tape machine or flash memory card reader (for flash memory read/write device in a digital camera) in addition to the hard disk drive to broaden the practicality of the mobile device.

It is known by persons being skill in art that it is not possible to perform functions of hot-swap and plug and play so that the power of the computer has to be shut down before the IDE storage device such as the hard disk in the computer being able to be replaced. Then, the computer can then be reset again to spend a lot of time. Nevertheless, there is no such trouble with USB interface and, it only needs USB interface periphery such as the flash memory card reader itself being controlled to be power on/off and the computer can read if the storage device exists and can determine the storage device has functions of hot-swap and plug and play. Hence, the different devices can be replaced without interfering the running computer. Therefore, it is a bottleneck has to be overcome by the. manufactures that how to allow IDE interface storage device being possible to have functions of hot-swap and plug and play.

SUMMARY OF THE INVENTION

The crux of the present invention is to provide an inner rack of a mobile rack in a computer and the inner rack has a rack chamber disposed at a central area thereof, a signal conversion circuit board disposed at a rear side thereof with a jut out inner signal connector at an outer side thereof. The inner signal connector provides a control IC for converting a USB interface signal into an IDE interface signal and a power outlet separating from an IDE interface connector at an inner side thereof. Once an IDE interface storage device is placed in and located at the rack chamber and the inner rack is inserted into an outer rack of the mobile rack, the inner signal connector engages with an outer signal connector suitable for IDE and USB interface signals to connect with an USB signal of the inner signal connector to an USB signal of the outer signal connector. The IDE interface storage device can provide functions of hot swap and plug and play via a switch control of power on/off.

BRIEF DESCRIPTION OF THE DRAWINGS

The present invention can be more fully understood by reference to the following description and accompanying drawings, in which.

DETAILED DESCRIPTION OF THE PREFERRED EMBODIMENTS

Figure 1:
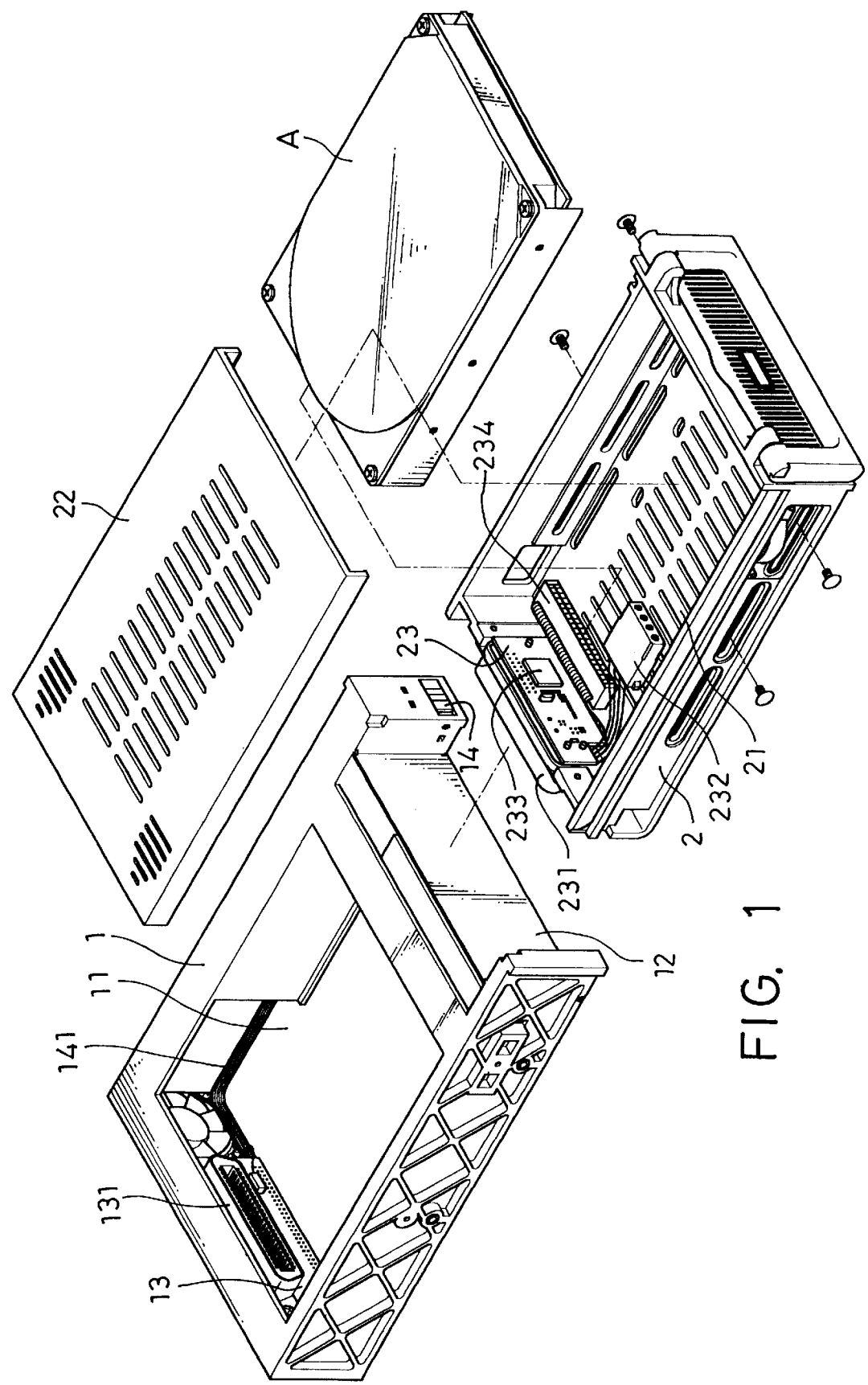
FIG. 1 is a perspective exploded view of a mobile rack according to the present invention.
Figure 2:
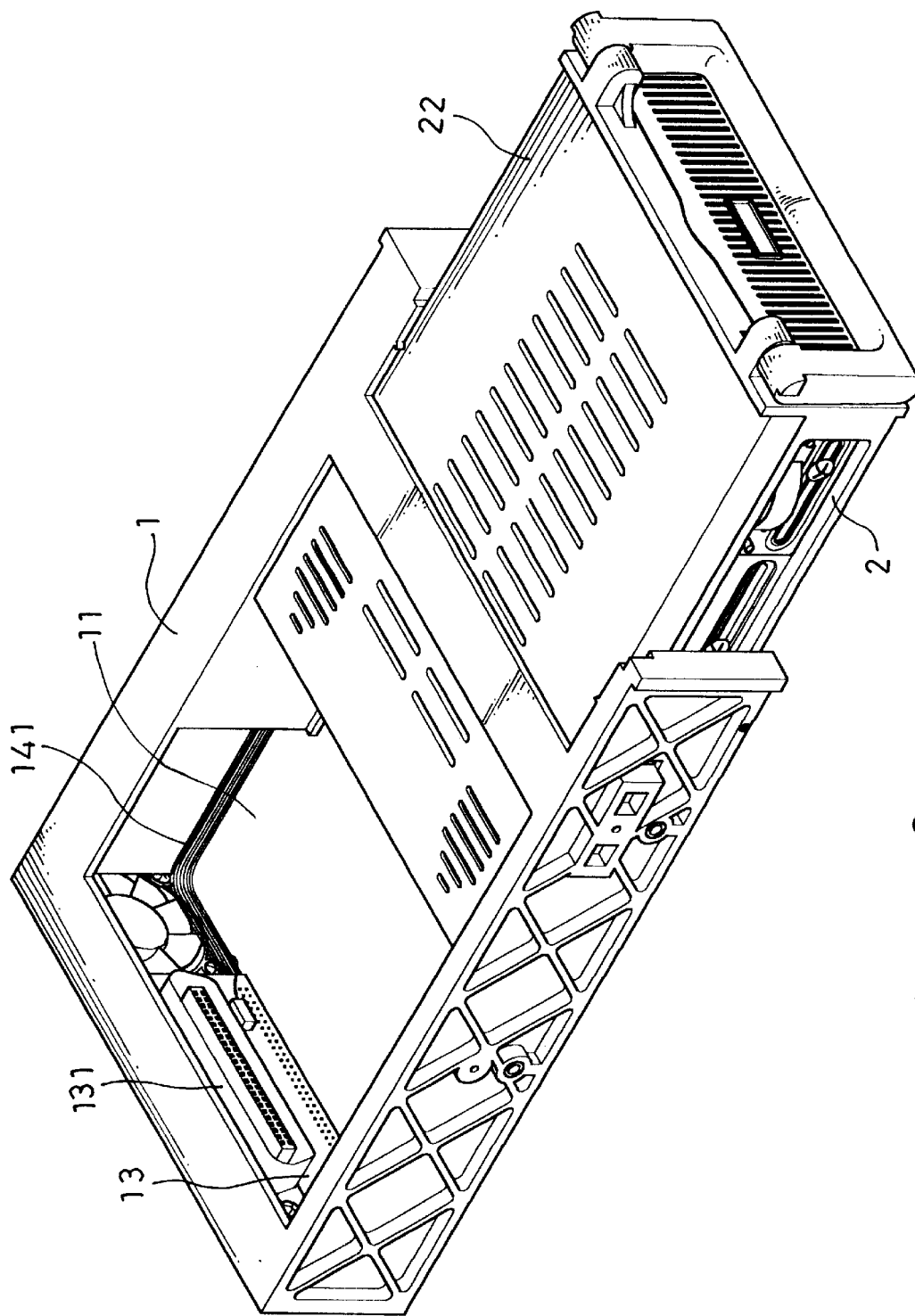
FIG. 2 is an assembled perspective view of the mobile rack shown in FIG. 1.

Referring to FIGS. 1 and 2, a computer mobile rack basically comprises an outer rack 1 and an inner rack 2 and the inner rack 2 can be slid into the outer rack 2 for connection or slid out for disengagement.

Wherein, the outer rack 1 has an IDE interface and a USB interface and it has been disclosed in the U.S. patent application Ser. No. 09/983,374. The outer rack 1 is mounted in a space of 5.25 inch of the main unit of the computer and a central room 11 thereof has an automatically returning gate 12. The rear side thereof has an outer circuit board 13 and a conventional 40-pin connector of standard IDE interface and a pair of conventional power input outlets (not shown).

The present invention is different from the prior art in that the outer circuit board 13 at the external side thereof provides a USB signal connector (not shown due to projection orientation) such that each signal can be parallel connected to an outer side signal connector 131 at the inner side of the outer circuit board 13. The outer side connector 131 has 50 pins and the 5th and the 13th pins are connected to +data and −data signals of the USB signal connector, the 4th and the 29th pins are parallel connected to the power source outlet and the USB connector respectively. The 2nd, the 3rd, the 27th, the 28th pins are parallel connected to the power source outlet and the grounding lines of the USB signal connector. The 1st and 26th pins are parallel connected to +12V power of the USB signal connector. The rest 40 pins are connected to the standard IDE interface connector. Besides, the outer circuit board connects with a switch 14 via a power line 141 on the outer rack 1 so as to control the power source being in a state of ON or OFF.

As the foregoing, it verifies that the outer rack 1 can be served as IDE interface and USB interface signals and can combine with the outer signal connector 131 as a signal input/output.

The inner rack 2 is a case corresponding the size of the central room 11 and provides a central rack chamber 21 for receiving and locating an IDE interface storage device A such as a hard disk driver, a ZIP diskette driver, MO, a magnetic tape machine or a flash memory card reader an upper lid 22 can be used for covering the rack chamber 21. The rack chamber 21 at the rear side thereof provides a signal conversion circuit board 23 and the outer side of the signal conversion circuit board 23 has a jut out inner rack signal connector 231 corresponding to the pins of the outer signal connector 131, the grounding line and the dual power sources. For instance, the 1st to the 5th pins and the 26th to 30th pins are 10 pins with contact poles and the rest 40 pins are not provided with contact poles such that the inner signal connector 231 only admits for the USB interface signal, dual power signals and the grounding line being input/output and for the signals of the dual power source and the grounding line being guided outward via a power output plug 232. The USB interface signal is changed as IDE interface-signal through a control IC 233 and extends outward via an IDE interface connector 234 so as to connect with an IDE interface storage device A such as the hard disk for running the storage device A.

Figure 3:
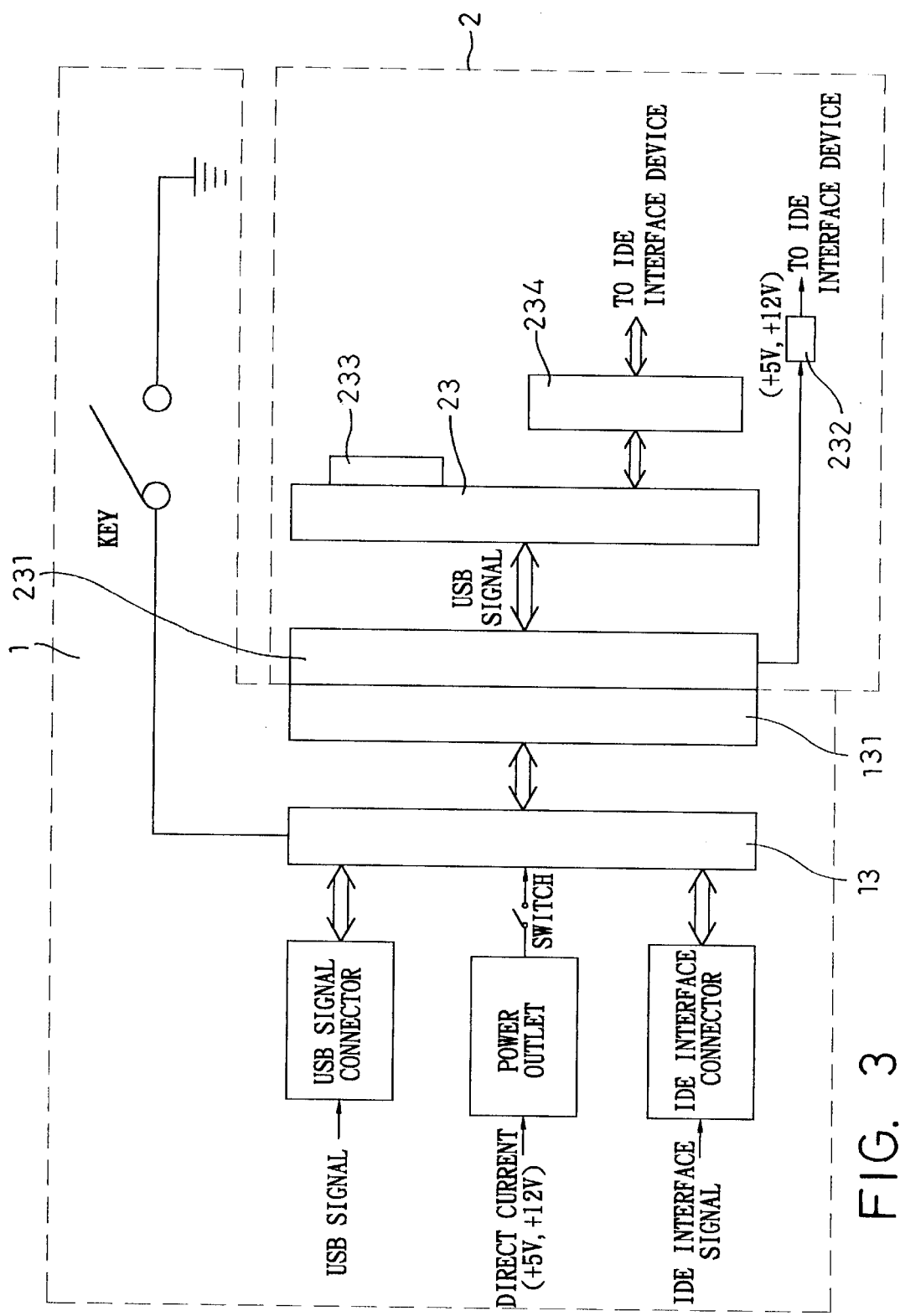
FIG. 3 is a schematic diagram illustrating a USB interface signal being converted to IDE interface signal in the present invention.
Figure 4:
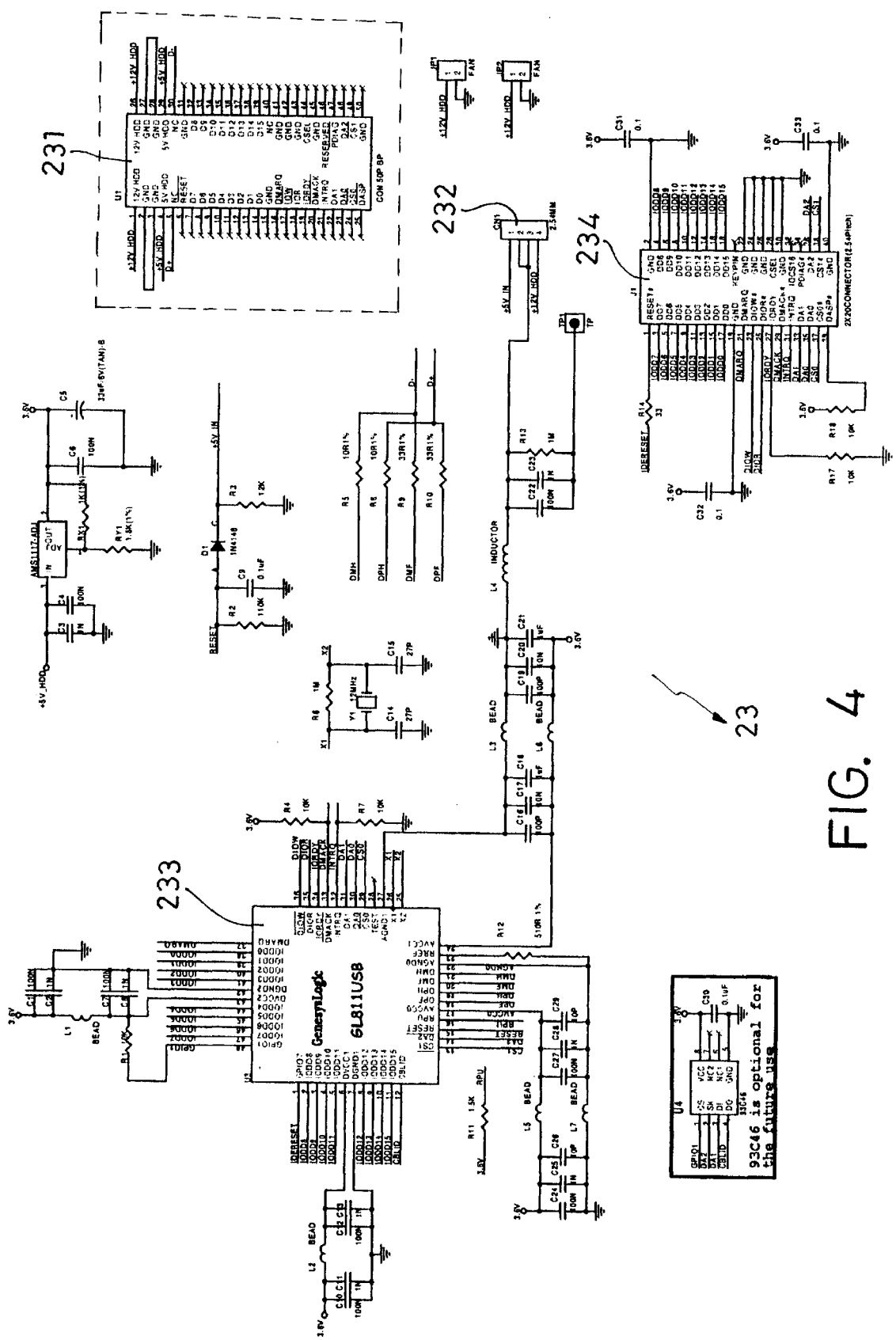
FIG. 4 is a circuit diagram on a circuit board for signal conversion in the present invention.

Wherein, the flow chart and related circuit with regard to the USB interface signal converting into the IDE interface signal are shown in FIGS. 3 and 4. The control IC 233 therein is made by, for instance, Genesys Logic Inc. and the model number thereof is GL811 USB.

Referring to FIGS. 1 to 2 again, in case of the inner rack being taken out and replaced, the switch 14 is stirred to be power off and the inner rack 2 can be slid outward from the front side of the outer rack 1 to form a hot disengagement. Then, a new inner rack 2 is inserted into the outer rack 1 and the inner signal connector 231 can be engaged to the outer signal connector 131 before the switch 14 being stirred to be power on. In the meantime, the computer can learned that a new storage device has been connected and it forms a state of plug and play. Hence, it is appreciated that the inner rack containing an IDE interface storage device can provide a function of USB interface with hot swap and plug and play though the power of the computer is kept ON.

Besides, an interface concentrator with multiple openings can be used for connecting with multiple mobile racks identical with the present invention as a server in case of the storage device in the respective inner rack being a hard disk. If the storage devices are different from each other, it is possible for the storage devices to be operated and used independently such that an inconvenience resulting from a computer being limited to set up four kinds of IDE interface devices or read/write devices only can be avoided. Moreover, the present invention utilizes hardware to convert the USB interface signal into an IDE interface signal instead of a special software, which is currently used to simulate USB interface signal as IDE interface signal, so that the deficiency such as poor software compatibility and being unable to comply with future upgrade of operation system can be avoided effectively.

While the invention has been described with reference to the a preferred embodiment thereof, it is to be understood that modifications or variations may be easily made without departing from the spirit of this invention, which is defined by the appended claims.

What is claimed is:

1. An inner rack of a mobile rack in a computer, comprising:
    a rack chamber disposed at a central area thereof;
    a signal conversion circuit board disposed at a rear side thereof, having a jut out inner signal connector at an outer side thereof, providing a control IC for converting a USB interface signal into an IDE interface signal, and having a power outlet separating from an IDE interface connector at an inner side thereof;
    whereby, once an IDE interface storage device is placed in and located at the rack chamber and the inner rack is inserted into an outer rack of the mobile rack, the inner signal connector engages with an outer signal connector suitable for IDE and USB interface signals to connect an USB signal of the inner signal connector to an USB signal of the outer signal connector; and the IDE interface storage device can provide functions of hot swap and plug and play via a switch control of power on/off.

2. The inner rack of a mobile rack in a computer as defined in claim 1, wherein the inner rack at a top thereof has a lid for closing the rack chamber.

3. The inner rack of a mobile rack in a computer as defined in claim 1, wherein the inner signal connector has contact poles at the USB signal, dual power signals and grounding signals.

4. The inner rack of a mobile rack in a computer as defined in claim 1, wherein the inner signal connector is a 50-pin connector with the 5th and the 13th pins thereof being connected to +data and −data signals of the USB signals, the 4th and the 29th pins thereof being parallel connected to the power outlet and the USB connector respectively, the 2nd, the 3rd, the 27th and the 28th pins thereof being parallel connected to the power outlet and grounding lines of the USB signal connector and the 1st and 26th pins being parallel connected to +12V power of the USB signal connector.

5. The inner rack of a mobile rack in a computer as defined in claim 1, wherein the IDE interface storage device is a hard disk drive, a ZIP diskette, a MO, a magnetic tape reader or a flash card memory card reader.

* * * * *